Patented May 27, 1941

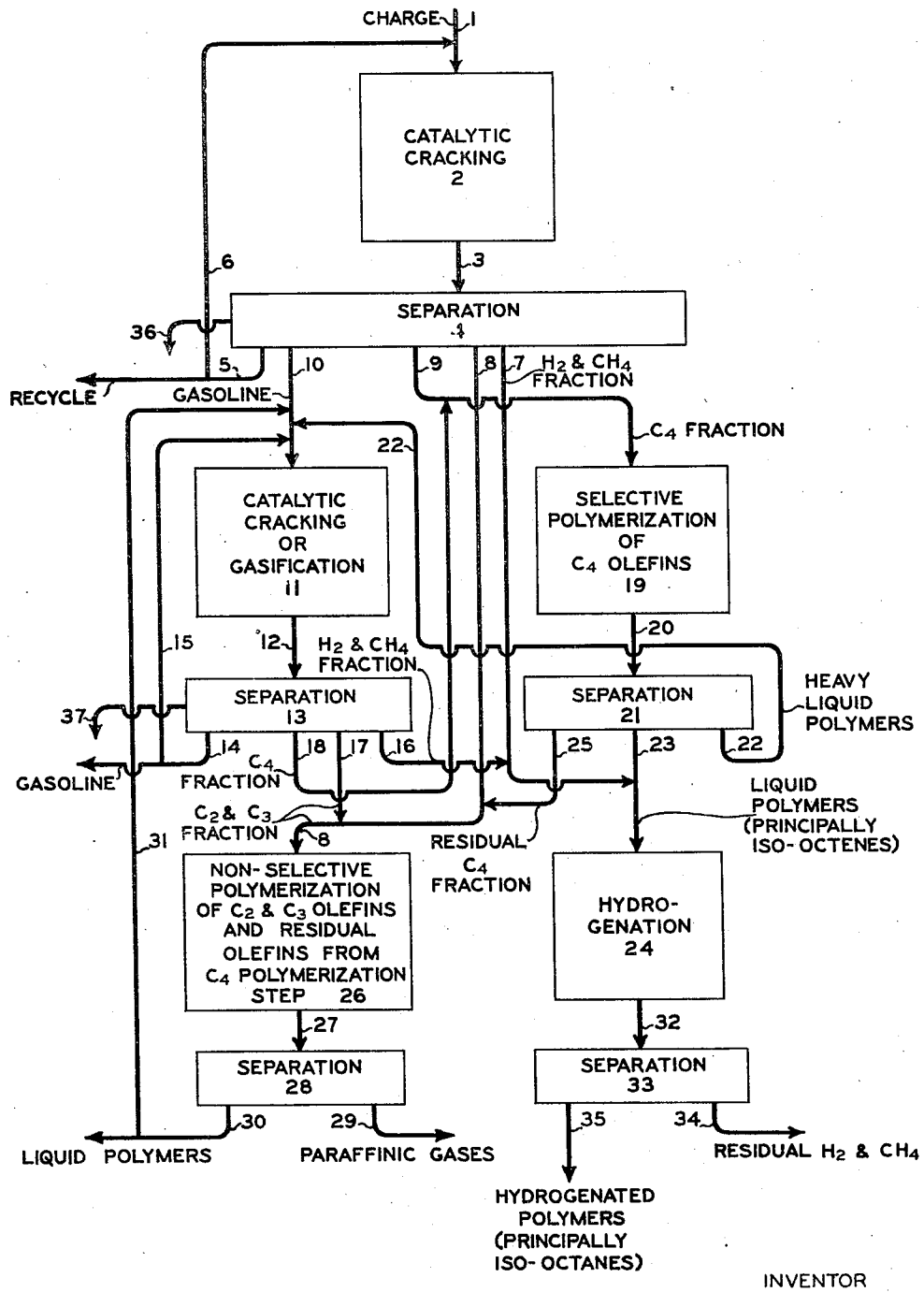

2,243,298

UNITED STATES PATENT OFFICE 2,243,298

PROCESS FOR THE MANUFACTURE OF GASOLINE AND ISO-OCTANE

Charles L. Thomas, Chicago, Ill., assignor to Universal Oil Products Company, Chicago, Ill., a corporation of Delaware Application February 24, 1939, Serial No. 258,255
Renewed May 31, 1940

8 Claims. (Cl. 196—10)

This invention relates particularly to the manufacture of high antiknock gasoline and iso-octane from hydrocarbon oils boiling above gasoline and more specifically to an integration of steps which involve separately treating by catalytic means fractions of the conversion products from a catalytic cracking step whereby to obtain a gasoline of high antiknock properties and iso-octane valuable as an aviation fuel.

In one specific embodiment the present invention comprises cracking gas-oil in the presence of a catalyst to produce therefrom relatively high yields of gasoline and normally gaseous hydrocarbons, separating the conversion products into a fraction consisting of hydrocarbons boiling above gasoline which is recycled to further treatment, a fraction consisting of hydrocarbons boiling in the range of gasoline, a fraction consisting predominantly of normally gaseous hydrocarbons containing 4 carbon atoms to the molecule, a fraction consisting of normally gaseous hydrocarbons containing 2 and 3 carbon atoms to the molecule, and a fraction consisting predominantly of methane and hydrogen, supplying said gasoline fraction to a gasification step to produce therefrom gasoline of high octane number and normally gaseous hydrocarbons, separating gasoline from the gaseous conversion products of the gasification step and recovering it as a product of the process, separating the normally gaseous hydrocarbons of the gasification step into fractions consisting predominantly of hydrocarbons containing 4 carbon atoms to the molecule, 2 and 3 carbon atoms to the molecule and hydrogen and methane and each fraction respectively commingled with their analogous fraction separated in the first mentioned separating step, supplying the gaseous fraction containing 4 carbon atoms to the molecule to a selective polymerization step to convert the olefins into substantial yields of iso-octenes, supplying liquid polymers and gases from said selective polymerization step to a separation step to separate fractions consisting of heavy polymers and normally gaseous hydrocarbons from the iso-octene fraction, returning said heavy polymer fraction to said gasification step, supplying the iso-octene fraction to a hydrogenation step to convert the iso-octenes into iso-octanes by contacting them with a suitable hydrogenating catalyst in the presence of the hydrogen and methane fraction, separated as previously described, commingling the normally gaseous hydrocarbon fraction from the selective polymerization step with the previously commingled fractions consisting of 2 and 3 carbon atoms to the molecule and supplying the mixture to a non-selective polymerization step to convert the olefinic materials into liquid polymers boiling in the range of gasoline, supplying the liquid polymers and the unconverted gases from the non-selective polymerization step to a separation step to separate the liquid polymers from the normally gaseous hydrocarbons, returning the liquid polymers from the non-selective polymerization step to said gasification step to convert them substantially into normally gaseous hydrocarbons containing 4 carbon atoms to the molecule, recovering the residual paraffinic gases from the non-selective polymerization step as a product of the process, supplying the hydrogenated iso-octenes together with the residual hydrogen and methane to a separation step to separate the hydrogen and methane to a separation step to separate the hydrogen and methane from the iso-octanes and recovering the latter as a product of the process.

One feature of the invention is to convert the charging stock by catalytic means into gasoline and gases relatively rich in polymerizable olefins and more particularly C₄ olefins.

Another feature of the invention is the separate polymerization of the C₄ olefinic hydrocarbons and the lighter olefinic hydrocarbons in the presence of suitable polymerizing catalysts to produce iso-octene and non-selective liquid polymers, respectively.

Still another feature is the conversion of the non-selective liquid polymers and the heavy polymers from the iso-octene polymerization step including trimers of the butenes and heavier into further yields of gaseous hydrocarbons relatively rich in C₄ olefins and particularly the iso-olefins by subjecting them to contact with a gasification catalyst in commingled state with the gasoline produced in the catalytic cracking step.

In the accompanying drawing in order to illustrate the process of the invention without complicating it with unnecessary details characteristic of each specific step, and since the industry is now familiar with the major steps of the process the general practice of illustrating each specific step in detail has been departed from and a flow diagram used instead.

Referring to the accompanying flow diagram, the hydrocarbon oil charging stock consisting of hydrocarbons boiling above gasoline is supplied through line 1 to catalytic cracking step 2 wherein it is subjected to contact, preferably in the vapor phase, with a cracking catalyst under conditions of temperature and pressure and conversion time regulated to produce therefrom high yields of gasoline and normally gaseous hydrocarbons.

Catalysts are preferably employed which have been found to be highly efficient in the catalytic cracking of hydrocarbon oils and consist in general of uniform size pellets of specially prepared silica composited with one or more of the following compounds: Alumina, zirconia, or thoria. However, catalysts, such as acid treated clays, metal oxides and others, may be employed in this step within the broad scope of the invention.

The conversion products from the catalytic cracking step are directed through line 3 to the separation step 4 which, although illustrated as a single zone in the flow diagram, may comprise a combined separating and fractionating step wherein conversion products including liquid residue and recycle, boiling above gasoline are separated from fractionated vapors which comprise hydrocarbons boiling in the range of gasoline and normally gaseous hydrocarbons, a demethanizing step wherein hydrogen and methane are separated from the gasoline and heavier normally gaseous hydrocarbons, a depropanizing step wherein the $C_2$ and $C_3$ gases are separated from the $C_4$ gases and gasoline followed by a debutanizing column wherein the $C_4$ gases are separated from the gasoline. The liquid residue is removed from the separation step, in the case here illustrated, through line 36, and is directed to storage or elsewhere as desired. The recycle fraction, comprising hydrocarbons boiling above gasoline, is removed from separation step 4, through line 5 and may be recovered as a product of the process. Preferably, however, it is directed through line 6, commingled with the charge in line 1, and subjected to substantial further cracking in catalytic cracking step 2.

The hydrogen and methane fraction is directed through line 7 to hydrogenation step 24. The $C_2$ and $C_3$, and the $C_4$ fractions are directed through lines 8 to 9 to the selective polymerization step 19 and the non-selective polymerization step 26, respectively, which will be described more fully later. The gasoline fraction is directed through line 10 to catalytic cracking or gasification step 11 wherein it is contacted, preferably in the vapor phase, with a cracking catalyst of essentially the same composition as that described above under conditions of temperature, pressure, and contact times selected to give optimum conversion to hydrocarbon gases rich in olefins containing 4 carbon atoms to the molecule.

The conversion products from gasification step 11, consisting essentially of liquid hydrocarbons boiling substantially in the range of gasoline and normally gaseous hydrocarbons, are directed through line 12 to separation step 13 which, although illustrated as a single zone in the drawing, may comprise a demethanizing step which in general consists of an absorption and stripping column for separating hydrogen and methane from the liquids and other gases, a depropanizing step for separating $C_2$ and $C_3$ gases from the gasoline and $C_4$ gases followed by a debutanizing step where the $C_4$ gases are separated from the gasoline and any liquids heavier than gasoline which may have been formed in the conversion step. When the conversion products contain hydrocarbons boiling above gasoline the debutanized gasoline may be subjected to fractionation to separate the same.

Preferably and in the case here illustrated, deep stabilization is practiced in the two debutanizing steps in order to remove substantially all of the $C_4$ gases from the gasoline fractions. The liquid fraction separated in separation step 13, consisting essentially of gasoline, is removed, in the case here illustrated, through line 14 and may be directed to storage or to further treatment or, when desired, it may be returned all or in part to gasification step 11 by way of line 15. Hydrocarbons boiling above gasoline are removed from separation step 13 by way of line 37. The hydrogen and methane fraction and the $C_2$ and $C_3$ fractions are directed from separation step 13 through lines 16 and 17 and are commingled with their analogous fractions removed in the first mentioned separation step in lines 7 and 8, respectively, for use, as subsequently described. The $C_4$ fraction from separation step 13 is directed through line 18 and is commingled with its corresponding fraction from separation step 4 in line 9 and the mixture, consisting essentially of butanes and butenes, is supplied to selective polymerization step 19 by way of line 9.

A sulphuric or phosphoric acid catalyst may be employed in the selective polymerization step and the temperature and pressure conditions may be regulated with either of these catalysts to effect polymerization of substantially all of the iso-butenes in the $C_4$ gases supplied to this zone with either catalyst. Some polymerization of the normal butenes present in the gases supplied to this step will also occur, but the conditions of operation may be regulated to minimize this reaction. Sulphuric acid is more selective to the conversion of iso-butenes than phosphoric acid when acid of the proper concentration and selected temperature and pressure conditions are employed and is therefore the preferred catalyst, although the so called solid phosphoric acid catalyst, comprising a mixture of a relatively inert carrier, such as kieselguhr impregnated with the ortho or pyro acid, will also give good results, and when the solid phosphoric acid catalyst is employed it is preferred that it be precalcined.

The products resulting from the selective polymerizing step, which consist of normally liquid polymers containing a high proportion of iso-octenes, some higher boiling fractions and unconverted gases consisting essentially of butanes and normal butenes, are supplied through line 20 to separating zone 21 wherein said gases and liquid polymers are separated. The latter may be removed from the system to cooling and storage or elsewhere by well known means, not illustrated in the flow diagram, but preferably the fractions which boil above the iso-octenes and cannot be advantageously hydrogenated are separately removed and directed through line 22 to gasification step 11 for conversion, as previously described. The iso-octene fraction is directed through line 23 to hydrogenated step 24 for further treatment, as will be later described. The unconverted butanes and normal butenes are directed through line 25 to line 8 to commingle therein with the $C_2$ and $C_3$ fractions from the separation steps 4 and 13 and the resulting mixture is supplied to the non-selective catalytic polymerization step 26.

Preferably, solid phosphoric acid catalyst of the type above described is employed in the non-selective polymerization step and the conditions of operation are controlled in this zone to effect polymerization of substantially all of the butenes as well as substantial proportions of the $C_2$ and $C_3$ olefins.

The products of the non-selective polymerization step, which consist essentially of liquid polymers boiling within the range of gasoline and unconverted paraffinic gases containing 2, 3, and 4 carbon atoms to the molecule, are supplied through line 27 to separation step 28 which, in the case here illustrated, may comprise a debutanizing column wherein substantially all of the unconverted olefinic gases and the paraffinic gases are removed from the liquid polymers. These gases are removed from separation step 28 through line 29 and may be directed to storage for use as fuel gas or elsewhere as desired. The liquid polymers are removed from separation step 28, in the case here illustrated, through line 30 and may be directed to storage for recovery as a product of the process. Preferably, however, they are returned through line 31 to gasification step 11 wherein they are converted into substantial yields of olefinic gases containing 4 carbon atoms to the molecule in commingled state with the products introduced, as previously described.

By supplying the residual $C_4$ fractions from the selective polymerization step, which consist essentially of butanes and unconverted normal butenes, to the non-selective polymerization step and polymerizing the olefinic gases contained therein in commingled state with the olefins of the $C_2$ and $C_3$ gases, subsequently supplying the polymers derived from the non-selective polymerization step to the gasification step to convert them into normally gaseous hydrocarbons and particularly iso-butenes while supplying the heavy polymers of the selective polymerization step to the same gasification step, the most advantageous treatment of the olefins is obtained in a process of this type with the result that high yields of iso-octenes are produced.

While the combination of cooperative steps outlined in the preceding description of the accompanying flow diagram is novel and advantageous without the hydrogenating step, previously referred to, the latter step is highly desirable in order to take full advantage of the other features of the combination and of the nature of the liquid polymers resulting from the selective polymerization step. Due to the selective polymerization of the iso-butenes in zone 19, the resulting liquid polymers will consist predominantly of iso-octenes, which, although of good antiknock value, may be hydrogenated to produce iso-octanes of even higher antiknock characteristics. The improvement resulting from hydrogenation of these liquid polymers is most pronounced in the absence or substantial absence of polymer products boiling above the range of iso-octenes.

Hydrogenation in zone 24 is accomplished in the presence of a catalyst which in the preferred embodiment of the invention consists of nickel on relatively porous particles of a relatively inert siliceous carrier, such as kieselguhr. The catalyst may be produced by precipitating nickel carbonate on kieselguhr, pressing into pills, and then drying and reducing directly with hydrogen at a temperature of 750° F. However, other hydrogenating catalysts well known in the art, such as, for example, the oxides of chromium, molybdenum, and tungsten may be employed, when desired. The hydrogen and methane fractions recovered in the process are employed as the source of hydrogen in hydrogenation zone 24 and are supplied to this zone through lines 7 and 23 in commingled state with the iso-octene fraction recovered in separation step 21. The resulting products, including the unused excess hydrogen and methane, are directed from zone 24 through line 32 to separation step 33 wherein the hydrogenated polymers are separated from any normally gaseous hydrocarbons and hydrogen. The hydrogenated polymers are directed through line 35 to cooling and storage or elsewhere as desired, and the gases are removed from the separation step 33 through line 34 and may be discharged from the system to storage or elsewhere or may, when desired, be returned by well known means, not illustrated, to the hydrogenating step for reuse of the hydrogen.

The operating conditions which may be employed in successfully conducting the process of the invention will vary considerably depending upon the type of charging stock employed, the composition of the fractions subjected to conversion in each of the individual cooperative steps, and the specific type of catalyst employed in each of the zones. Since no novelty is claimed for any of the individual conversion steps of the system nor for the catalyst which may be used therein, and since regulation of the operating conditions in each of the individual steps to accomplish the object herein set forth is within the skill of those familiar with the art, no attempt will be made herein to define the limits of satisfactory operating conditions.

The following example of one specific operation of the process will serve to illustrate satisfactory operating conditions as applied to specific catalysts and a specific charging stock. The example, however, should not be considered as a limitation. The charging stock, a 36.7° A. P. I. gravity Mid-continent gas-oil, was subjected to catalytic cracking in the presence of a silica-alumina mass at a temperature of approximately 930° F. at a pressure of 42 pounds absolute. The conversion products were supplied to the separating zone of a combined separator and fractionator maintained at substantially the same pressure as that employed on the outlet of the conversion zone wherein liquid residue was separated from the vaporous conversion products and withdrawn therefrom as a product of the process. The vaporous conversion products were supplied to the fractionating zone to separate fractionated vapors of the desired end boiling point from the higher boiling hydrocarbons which were condensed as reflux condensate and returned to the conversion step. The fractionated vapors were subjected to cooling and condensation and the resulting distillate and gas collected and separated. The gases were supplied to an absorption column, which utilized debutanized distillate, produced as subsequently described, as absorption oil and a fraction, consisting predominantly of hydrogen and methane, was recovered from the absorption column for use as subsequently described. The enriched absorber oil and the distillate collected, as previously described, were supplied to a depropanizing column from which a fraction, consisting predominantly of $C_2$ and $C_3$ gases, was recovered. The depropanized distillate was supplied to a debutanizing column from which a fraction, consisting predominantly of $C_4$ gases, was recovered. The debutanized distillate was subjected to catalytic gasification in the presence of a silica-alumina mass at a temperature of approximately 1020° F. at a pressure of approximately 40 pounds absolute.

The conversion products from the gasification step, consisting predominantly of gasoline and gaseous hydrocarbons, were subjected to treatment substantially the same as that afforded the distillate and gaseous hydrocarbons in the first step. The debutanized gasoline was recovered as a product of the process and the gaseous fractions separated in the last mentioned separation step were commingled with their analogous fraction from the first mentioned step.

The commingled $C_4$ gases were subjected to selective polymerization in the presence of a solid phosphoric acid catalyst at a temperature of approximately 325° F. and under a superatmospheric pressure of approximately 700 pounds per square inch whereby to polymerize substantially all of the iso-butenes and approximately 1½ times that volume of normal butenes so that the product obtained after hydrogenation had an octane rating of approximately 95. The conversion products from the selective polymerization step were subjected to separation to separate heavy liquid polymers and residual $C_4$ gases from liquid polymers, consisting predominantly of iso-octenes, which were subjected to further treatment to be later described. The heavy liquid polymers were returned to the gasification step so as to convert them into gaseous hydrocarbons more valuable as charging stock to the selective polymerization process. The residual $C_4$ gases from the selective polymerization step were commingled with the combined fractions of $C_2$ and $C_3$ gases from the two first mentioned separation steps and the mixture subjected to non-selective polymerization in the presence of a solid phosphoric acid catalyst at a temperature of approximately 475° F. and under a pressure of approximately 200 pounds per square inch. The conversion products from the non-selective polymerization step were supplied to a separation step to separate normally gaseous hydrocarbons from the liquid polymers. The liquid polymers were returned to the gasification step to convert them into gaseous hydrocarbons, more valuable as a charging stock, to the selective polymerization step, and the gases being predominantly paraffinic were recovered as a product of the process for use as fuel or any other desired usage.

The liquid polymers, consisting predominantly of iso-octenes separated in the separation step following the selective polymerization step, were subjected to hydrogenation using the hydrogen and methane fractions, separated as previously described, as the source of hydrogen, in the presence of a nickel catalyst at a temperature of approximately 390° F. and under a pressure of approximately 200 pounds per square inch. The products from the hydrogenation step were subjected to separation to separate hydrogen and methane from the iso-octanes which were recovered as a product of the process.

This operation yielded approximately 50.7% by weight of 81 octane number gasoline, 24.5% by weight of 95 octane number iso-octane, and 5.2% of liquid residue. The balance of 20.6% was gas and loss.

I claim as my invention:

1. A process for converting hydrocarbon oil into gasoline of high antiknock value and iso-octenes, which comprises catalytically cracking said oil to produce therefrom high yields of normally gaseous hydrocarbons containing 4 carbon atoms to the molecule and gasoline in a primary cracking step, separating the conversion products into fractions consisting predominantly of hydrogen and methane, ethane and propane and their corresponding olefins, butanes and their corresponding olefins, gasoline, recycle, and liquid residue, recovering said liquid residue as a product of the process, returning said recycle fraction to said primary cracking step, subjecting said gasoline fraction to further catalytic cracking in a second cracking step to produce therefrom high yields of normally gaseous hydrocarbons rich in 3 and 4 carbon atom olefins, separating the conversion products from said second cracking step into fractions consisting predominantly of hydrogen and methane, ethane and propane and their corresponding olefins, butanes and their corresponding olefins, gasoline of high antiknock value and liquid residue, which are recovered as products of the process, commingling the corresponding gaseous fractions from both separation steps, subjecting the fractions consisting predominantly of butanes and their corresponding olefins to selective polymerization to produce therefrom substantial yields of iso-octenes, separating heavy liquid polymers and unconverted gases from the iso-octenes, returning said heavy liquid polymers to said second cracking step, commingling said unconverted gases with the fractions consisting predominantly of ethane and propane and their corresponding olefins, subjecting the mixture to non-selective polymerization to polymerize substantial portions of the olefinic hydrocarbons, and returning the liquid polymers produced in said non-selective polymerization step to said second cracking step.

2. A process for converting hydrocarbon oil into gasoline of high antiknock value and iso-octenes, which comprises catalytically cracking said oil to produce therefrom high yields of normally gaseous hydrocarbons containing four carbon atoms to the molecule and gasoline in a primary cracking step, separating the conversion products into fractions consisting predominantly of hydrogen and methane, ethane and propane and their corresponding olefins, butanes and their corresponding olefins, gasoline, recycle and liquid residue, recovering said liquid residue and said recycle fraction as products of the process, subjecting said gasoline fraction to further catalytic cracking in a second cracking step to produce therefrom high yields of normally gaseous hydrocarbons rich in 3 and 4 carbon atom olefins, separating the conversion products from said second cracking step into fractions consisting predominantly of hydrogen and methane, ethane and propane and their corresponding olefins, butanes and their corresponding olefins, and gasoline of high antiknock value and liquid residue, which are recovered as products of the process, commingling the corresponding gaseous fractions from both separation steps, subjecting the fractions consisting predominantly of butanes and their corresponding olefins to selective polymerization to produce therefrom substantial yields of iso-octene, separating heavy liquid polymers and unconverted gases from the iso-octenes, returning said heavy liquid polymers to said second cracking step, commingling said unconverted gases with the fractions consisting predominantly of ethane and propane and their corresponding olefins, subjecting the mixture non-selective polymerization to polymerize substantial portions of the olefinic hydrocarbons, and returning the liquid polymers produced in said non-selective polymerization step to said second cracking step.

3. A process for converting hydrocarbon oil into gasoline of high antiknock value and iso-octenes, which comprises catalytically cracking said oil to produce therefrom high yields of normally gaseous hydrocarbons containing 4 carbon atoms to the molecule and gasoline in a primary cracking step, separating the conversion products into fractions consisting predominantly of hydrogen and methane, ethane and propane and their corresponding olefins, butanes and their corresponding olefins, gasoline, recycle, and liquid residue, recovering said liquid residue as a product of the process, returning said recycle fraction to said primary cracking step, subjecting said gasoline fraction to further catalytic cracking in a second cracking step to produce therefrom high yields of normally gaseous hydrocarbons rich in 3 and 4 carbon atom olefins, separating the conversion products from said second cracking step into fractions consisting predominantly of hydrogen and methane, ethane and propane and their corresponding olefins, butanes and their corresponding olefins, gasoline and liquid residue which are recovered as products of the process, returning said gasoline fraction recovered from said second cracking step to substantial further cracking in the same step, commingling the corresponding gaseous fractions from both separation steps, subjecting the fractions consisting predominantly of butanes and their corresponding olefins to selective polymerization to produce therefrom substantial yields of iso-octene, separating heavy liquid polymers and unconverted gases from the iso-octenes and returning said heavy liquid polymers to said second cracking step, commingling said unconverted gases with the fractions consisting predominantly of ethane and propane and their corresponding olefins, subjecting the mixture to non-selective polymerization to polymerize substantial portions of the olefinic hydrocarbons, and returning the liquid polymers produced in said non-selective polymerization step to said second cracking step.

4. A process for converting hydrocarbon oil into gasoline of high antiknock value and iso-octenes, which comprises catalytically cracking said oil to produce therefrom high yields of normally gaseous hydrocarbons containing 4 carbon atoms to the molecule and gasoline in a primary cracking step, separating the conversion products into fractions consisting predominantly of hydrogen and methane, ethane and propane and their corresponding olefins, butanes and their corresponding olefins, gasoline, recycle, and liquid residue, recovering said liquid residue as a product of the process, returning said recycle fraction to said primary cracking step, subjecting said gasoline fraction to further catalytic cracking in a second cracking step to produce therefrom high yields of normally gaseous hydrocarbons rich in 3 and 4 carbon atom olefins, separating the conversion products from said second cracking step into fractions consisting predominantly of hydrogen and methane, ethane and propane and their corresponding olefins, butanes and their corresponding olefins, and gasoline of high antiknock value and liquid residue, which are recovered as products of the process, commingling the corresponding gaseous fractions from both separation steps, subjecting the fractions consisting predominantly of butanes and their corresponding olefins to selective polymerization to produce therefrom substantial yields of iso-octene, separating heavy liquid polymers and unconverted gases from the iso-octenes and returning said heavy liquid polymers to said second cracking step, commingling said unconverted gases with the fractions consisting predominantly of ethane and propane and their corresponding olefins and subjecting the mixture to non-selective polymerization to polymerize substantial portions of the olefinic hydrocarbons, and recovering liquid polymers produced in said non-selective polymerization step as a product of the process.

5. A process for converting hydrocarbon oil into gasoline of high antiknock value and iso-octanes, which comprises catalytically cracking said oil to produce therefrom high yields of normally gaseous hydrocarbons containing 4 carbon atoms to the molecule and gasoline in a primary cracking step, separating the conversion products into fractions consisting predominantly of hydrogen and methane, ethane and propane and their corresponding olefins, butanes and their corresponding olefins, gasoline, recycle, and liquid residue, recovering said liquid residue as a product of the process, returning said recycle fraction to said primary cracking step, subjecting said gasoline fraction to further catalytic cracking in a second cracking step to produce therefrom high yields of normally gaseous hydrocarbons rich in 3 and 4 carbon atom olefins, separating the conversion products from said second cracking step into fractions consisting predominantly of hydrogen and methane, ethane and propane and their corresponding olefins, butanes and their corresponding olefins, and gasoline of high antiknock value and liquid residue, which are recovered as products of the process, commingling the corresponding gaseous fractions from both separation steps, subjecting the fractions consisting predominantly of butanes and their corresponding olefins to selective polymerization to produce therefrom substantial yields of iso-octenes, separating heavy liquid polymers and unconverted gases from the iso-octenes and returning said heavy liquid polymers to said second cracking step, subjecting said iso-octenes to hydrogenation, utilizing the hydrogen and methane fractions, separated as hereinbefore set forth, as the source of hydrogen, commingling said unconverted gases with the fractions consisting predominantly of ethane and propane and their corresponding olefins and subjecting the mixture to non-selective polymerization to polymerize substantial portions of the olefinic hydrocarbons, and returning the liquid polymers produced in said non-selective polymerization step to said second cracking step.

6. A conversion process which comprises cracking hydrocarbon oil to produce lower boiling distillate, propene and butenes therefrom, separating the distillate, propene and butenes, subjecting the butenes to polymerization to produce iso-octenes therefrom, separately polymerizing the propene and combining resultant propene polymers with at least a portion of said distillate, gasifying the resultant mixture, at least in part, to produce additional butenes, and supplying the latter to the first-mentioned polymerizing step.

7. A conversion process which comprises cracking hydrocarbon oil and separating from the resultant products a normally liquid distillate, a propene-containing fraction and a normally gaseous fraction containing normal and iso-butenes, subjecting the last-named fraction to polymerization under iso-butene polymerizing conditions and separating the polymers from unconverted normal butenes, combining the latter with said propene-containing fraction and subjecting the mixture to independent polymerization to polymerize propene and normal butenes, combining polymer products of the last-mentioned step with at least a portion of said distillate, gasifying the resultant mixture, at least in part, to produce additional butenes, and supplying the latter to the first-mentioned polymerizing step.

8. The process as defined in claim 6 further characterized in that said iso-octenes are separated from heavier polymer products produced by the first-mentioned polymerization and such heavier products supplied to the gasifying step.

CHARLES L. THOMAS.